UNITED STATES PATENT OFFICE.

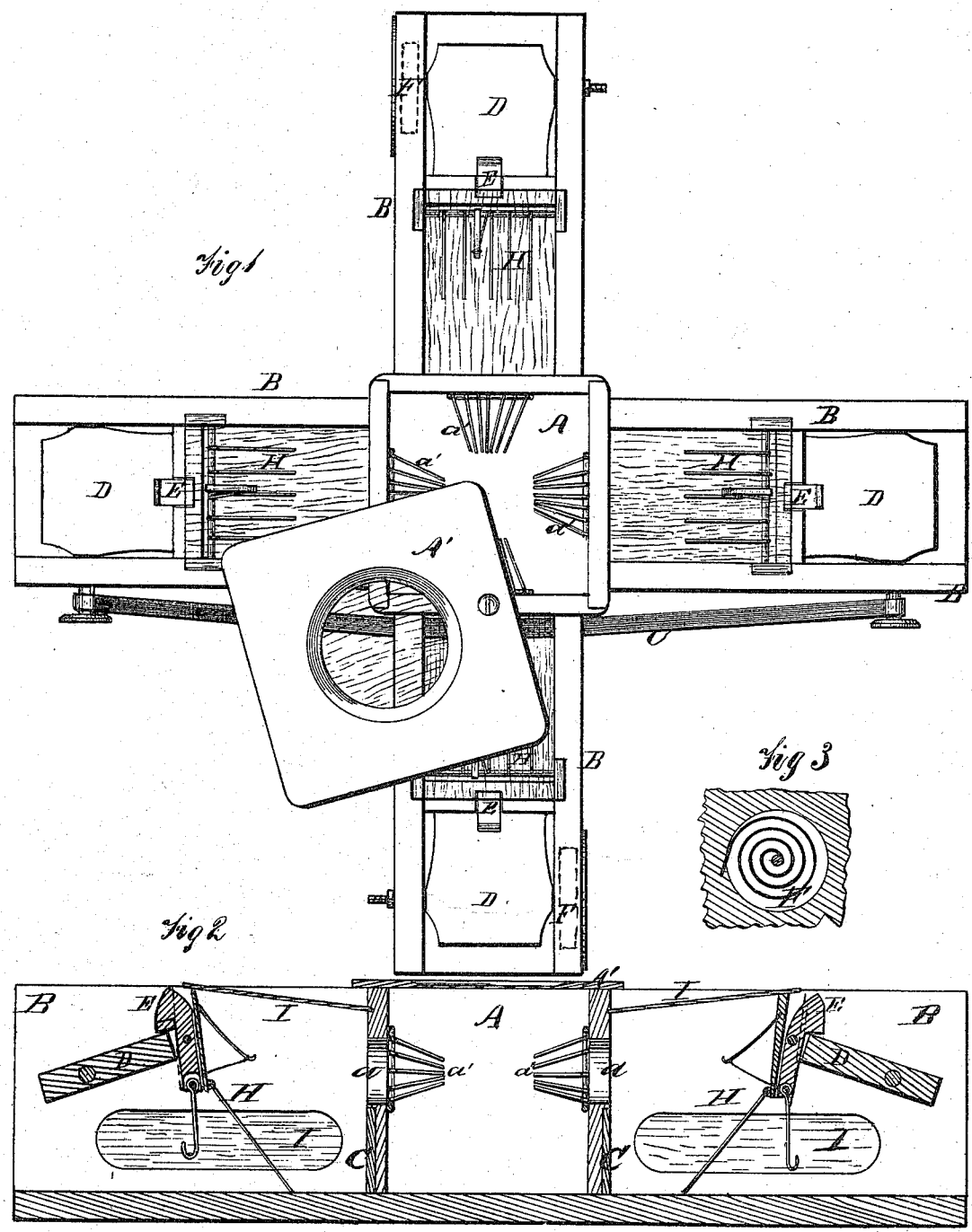

JOHN M. WILKINSON, OF BLOOMINGTON, TENNESSEE.

IMPROVEMENT IN ANIMAL-TRAPS.

Specification forming part of Letters Patent No. 142,362, dated September 2, 1873; application filed January 22, 1873.

*To all whom it may concern:*

Be it known that I, J. M. WILKINSON, residing in Bloomington, county of Tipton and State of Tennessee, have invented a certain Improvement in Rat-Traps, of which the following is a specification:

In the annexed drawing, Figure 1 is a plan view of my improved rat-trap. Fig. 2 is a side view of a portion of the same, exhibiting the spring attached to or connected with the trap-door for actuating it; and Fig. 3 is a vertical central section thereof.

In the several figures corresponding parts are illustrated by corresponding letters.

To enable others to make and use my invention, I will proceed to describe it.

In the accompanying drawing, A refers to a box or pen, each side of which is supplied with an orifice, $a\ a$, in a line with which, and to the sides of the said box, are fastened other boxes or receptacles, B B. Around the said orifices, and protruding inwardly toward the center of the box A, are fastened metallic bars $a'\ a'$, which are arranged in a conical form, and sharpened, whereby the animal may be permitted to pass through them in his passage to the said box and enter the latter; but, upon his attempting to return, be baffled, and, consequently, caused to remain therein. Mirrors C C are supplied to the outside of the box A at a point directly below the orifices or entrances $a\ a$ and in a line with the interior of the boxes B, the object being to allow the animal approaching the bait suspended in the trap to see himself, and be encouraged to go forward, and, indeed, to hasten his movement in entering the trap; the last-named movement resulting from seeing that the bait is apparently sought by another animal. D D refer to the trap-doors, which are supplied at a point near their forward ends with axles, having their bearings in apertures or boxes in the sides of the boxes B. The rear edge of these doors, when set so as to allow the animal to enter the trap, is caught and held in a horizontal position by an upright notched bar or catch, E, hung upon a horizontal bar or rod supported in the sides of the boxes B. Upon the projecting ends of the axles of the trap-doors are secured coiled metallic springs F, as shown in Fig. 2, or bands of rubber G, passing around and connecting every two of these rollers upon the same side of the boxes B, may be used, the object of these springs being twofold: First, to cause the said doors to be brought down or whirled around in such a manner as to strike the rat attempting to get the bait, and force him into the trap so as to be unable to return; and, secondly, to enable the said doors to reset themselves, as, while they are being whirled around, the rear edges thereof will be caught and held by the notched bar or catch E, from which the bait is suspended in a horizontal position, in readiness again for another rat to enter the trap.

H H refer to inner doors suspended in an inclined position within the boxes B in a line with and a short distance in rear of the doors D. These doors are so hung as that the animal can readily lift them and pass beyond them, after having been forced within the trap by the spring-doors D, but will be prevented from returning; consequently to escape from the boxes B they will have to continue to move in the same direction as that in which they entered the said boxes, in event of which they will be entrapped in the central box or pen A, from which the animals can be removed by simply lifting its cover A' off. In the sides of each of the boxes B, and in the tops of the same, are made openings suitably supplied with glass, constituting windows I, through which an increased amount of light may be admitted to the chambers of the boxes of the trap, for the purpose of making the interior of the trap as inviting as possible, and also to throw light upon the animal to aid in his seeing his image in the mirrors.

Having thus described my invention, what I claim, and desire to secure by Letters Patent, is—

The box A, with openings or entrances $a\ a$, encircled by the cone of bars $a'\ a'$, and supplied with the mirrors C C, in combination with the boxes B B, having the spring trap-doors D D, notched bars or catches E, and inner doors H, substantially as and for the purpose specified.

In testimony whereof I have hereunto subscribed my name this 19th day of August, A. D. 1872, in presence of two subscribing witnesses.

J. M. WILKINSON.

Witnesses:
WILLIAM SANFORD,
E. P. HALL.